(No Model.) 3 Sheets—Sheet 1.
F. W. LANCHESTER.
GAS OR OIL MOTOR ENGINE.
No. 592,794. Patented Nov. 2, 1897.
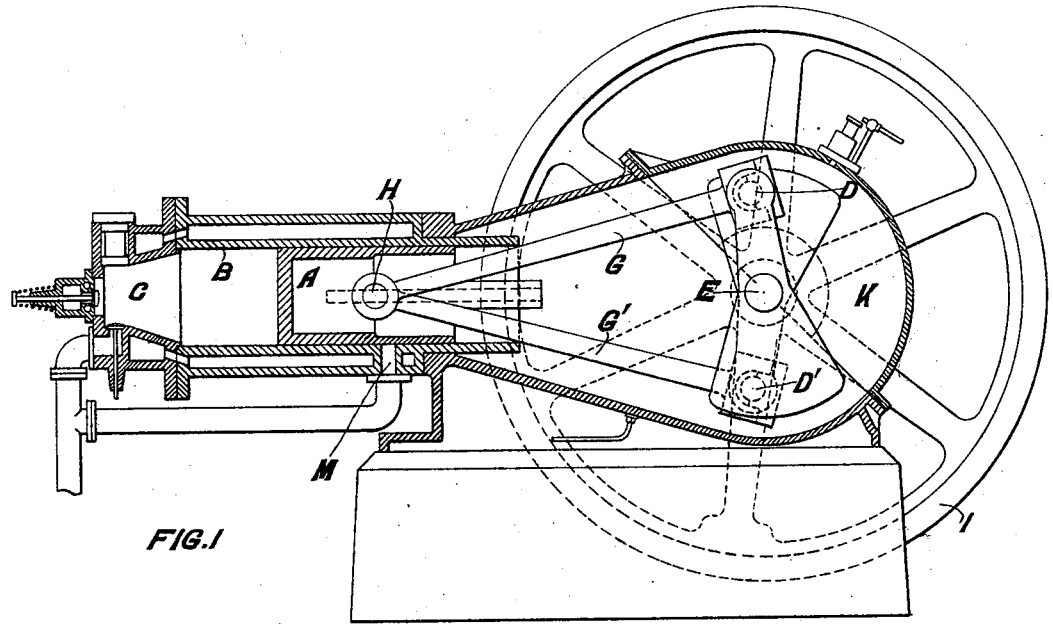
FIG.1
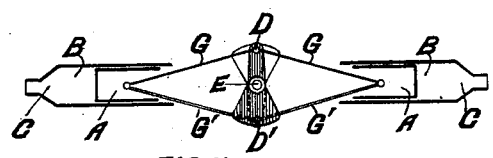
FIG.II
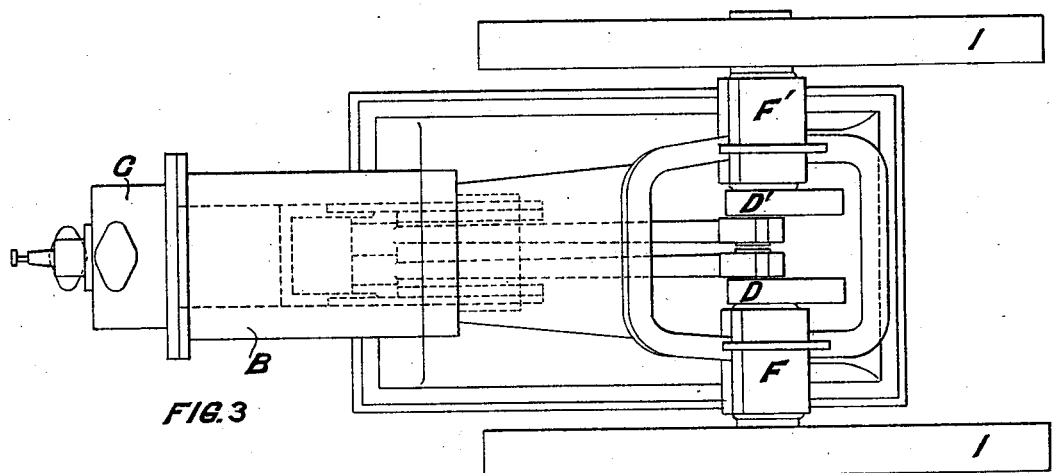
FIG.3
Witnesses
H. van Oldeneel
E. A. Scott
Inventor
Frederick William Lanchester
by Richards R
Attorneys (No Model.) 3 Sheets—Sheet 2.

F. W. LANCHESTER.
GAS OR OIL MOTOR ENGINE.

No. 592,794. Patented Nov. 2, 1897.

Witnesses
H. van Oldenneel
E. A. Scott

Inventor
Frederick William Lanchester
by
Attorneys (No Model.) 3 Sheets—Sheet 3.
F. W. LANCHESTER.
GAS OR OIL MOTOR ENGINE.
No. 592,794. Patented Nov. 2, 1897.
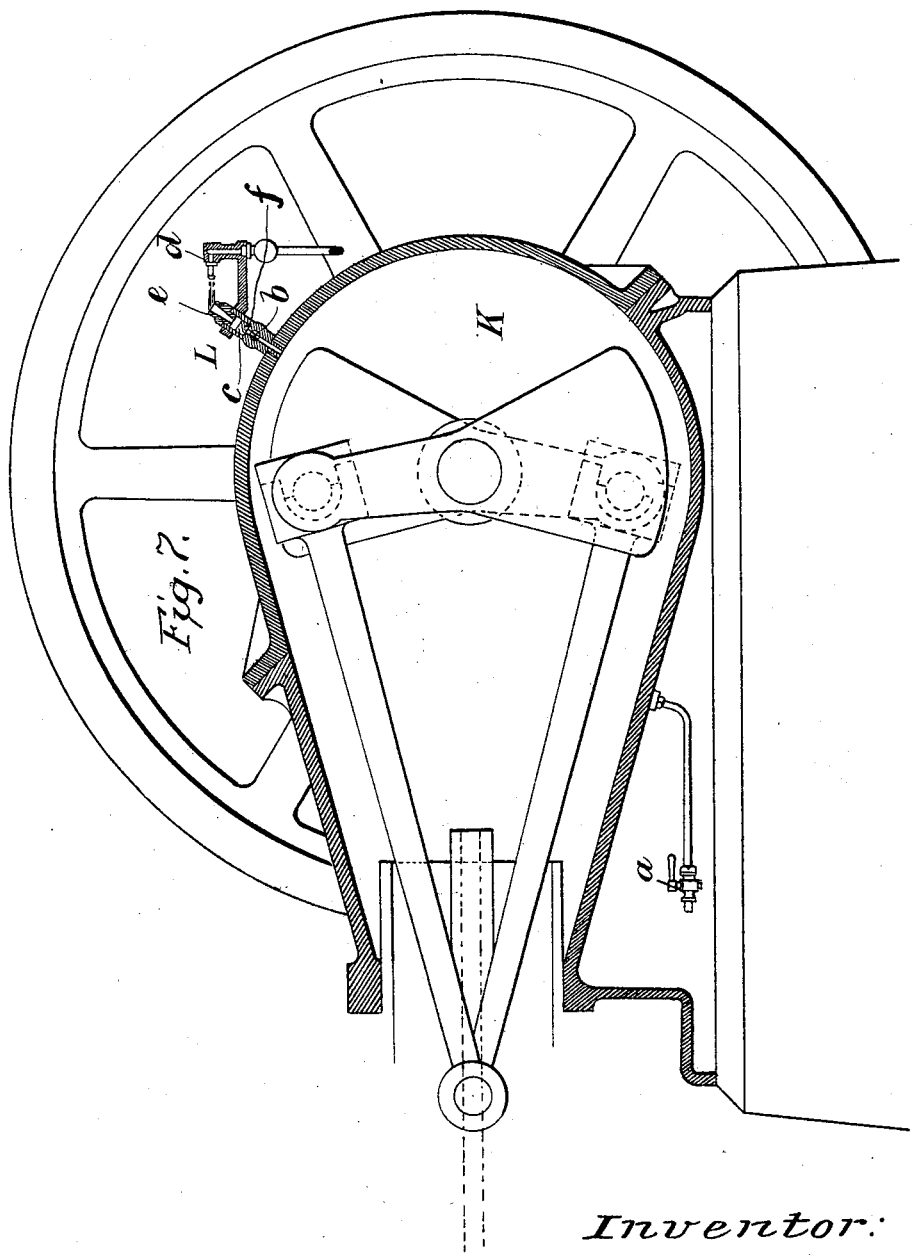

UNITED STATES PATENT OFFICE.

FREDERICK WILLIAM LANCHESTER, OF ALVECHURCH, ENGLAND.

GAS OR OIL MOTOR ENGINE.

SPECIFICATION forming part of Letters Patent No. 592,794, dated November 2, 1897.

Application filed July 8, 1896. Serial No. 598,480. (No model.)

*To all whom it may concern:*

Be it known that I, FREDERICK WILLIAM LANCHESTER, a citizen of Great Britain, and a resident of Cobley Hill, Alvechurch, in the county of Warwick, England, have invented certain new and useful Improvements in Gas and Oil Motor Engines, of which the following is a specification.

This invention relates to improvements in gas and oil motor engines and vaporizing apparatus for use in connection with the same, and has for its main object the construction of a gas or oil motor engine of few moving parts in such manner that little or no vibration shall be communicated to any vehicle or other structure to which the frame of the engine is attached; also, to provide ready means for starting the engine without manual labor.

Figure 4:
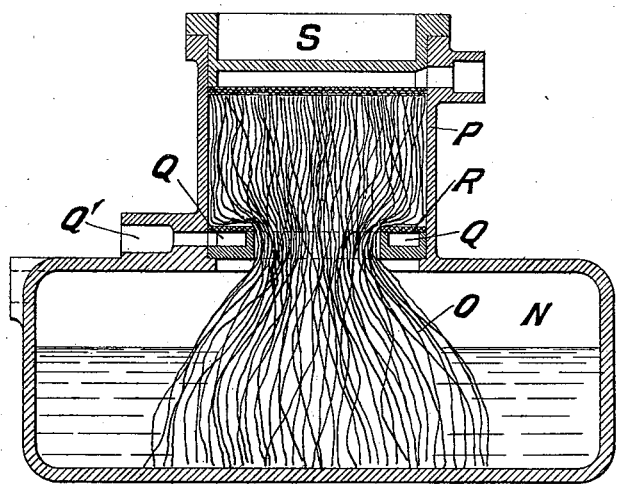
Figure 6:
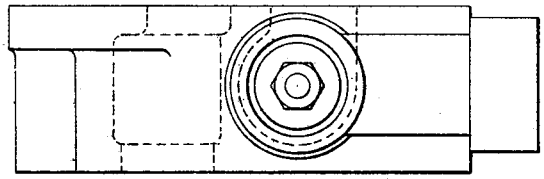
Figure 5:
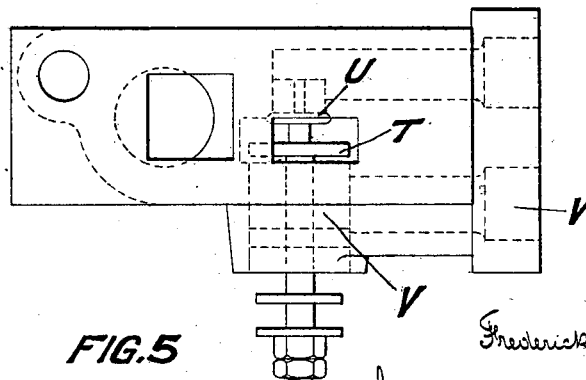

Referring to the two accompanying sheets of drawings, Figure 1 is a longitudinal section of an engine constructed in accordance with my invention. Fig. 2 is a plan. Fig. 3 is a modification having two cylinders. Fig. 4 is a section of my vaporizing device. Fig. 5 is a side elevation, on a larger scale, of the oil-vapor valve; and Fig. 6 is a corresponding plan. Fig. 7 is a detail sectional view showing how the igniter and charging device is applied to the engine.

In one method of carrying my invention into effect I construct an engine comprising a piston A, working in a cylinder B, connected to a compression-space C in the usual manner with valves and gear of any known suitable type. Instead of the usual single crank-shaft and connecting-rod I arrange two crank-shafts D D' to turn in opposite directions about a common axis E, their respective bearings F F' being arranged on opposite sides of the frame of the engine, the crank-pins being connected by two connecting-rods G G', arranged side by side and connecting to a common pin H, fitted to the piston A or cross-head. The cranks are of the overhung type and may be formed of a single piece or disk, or other built-up crank may be used, each crank carrying a balance-weight on the side opposite the crank-pin and as near the center line of engine as possible. These balance-weights may be arranged either to just balance the piston, connecting-rods, &c., or to somewhat overbalance them, in which case small compensating weights are arranged on the shafts at points remote from the center line, but on the same side as the crank-pin. Fly-wheels I I of equal weight or about equal weight are keyed onto the crank-shafts either inside or outside the bearings, and the balance-weights may be arranged as pieces cast onto the fly-wheels. The action of this balancing arrangement (supposing the motor to be of the horizontal type) is as follows: The approximately harmonic motion of the motor-piston is compensated by the horizontal component of the circular motion of the balance-weights, the vertical components of which neutralize each other, the direction of motion being contrary, the object of the hereinbefore-mentioned compensating weights being to counteract any tendency to rocking motion of the engine due to the planes of motion of the main balance weights being slightly separated in order to leave sufficient space to accommodate the connecting-rods. The two cranks may, if required, be arranged side by side.

It will be seen in the foregoing arrangements that when an explosion takes place in the motor-cylinder an equal quantity of angular momentum is imparted to each of the fly-wheels I in opposite directions, and consequently there is no unbalanced couple acting on the frame of the engine, as is the case in a gas-engine of the ordinary type.

In one mode of constructing a starting-gear in accordance with the present invention I inclose a crank-chamber K entirely in a sufficiently-strong casing and arrange thereon a gas injector and igniter L—such, for instance, as described in specification of English Patent No. 5,479/90, granted to the present applicant—the said injector and igniter being so arranged relatively to one another on the casing that the crank-chamber initially containing air can be charged with sufficient gas to form explosive mixture and ignition effected in the manner described.

The gas injector and igniter L hereinbefore referred to is clearly shown on Fig. 7 of the drawings, which illustrates on an enlarged scale the gas injector and igniter L fitted upon the crank-chamber K and constructed and operated as follows: When the engine is stopped, the crank-chamber K is allowed to fill with pure air through any suitable inlet or through the port M, and when the engine is to be started the cranks are set well over their outer centers and the cock $a$ opened to the gas-supply. The cock $d$ is also opened and the jet issuing therefrom is lighted. The gas from $a$ displaces air first from the chamber K, forcing it through the open cock $b$ and up the spiral groove $f$ cut in the outside of the valve $c$, and out of the nozzle $e$, past the burning jet. In a short time, however, a mixture forms and lights at the nozzle $e$, finally burning with a sharp roar and blue flame. When this occurs, the cock $a$ is turned off and the flame shoots back into the chamber K and ignites the mixture contained there, the explosion pressure lifting up and closing the valve $c$ against the shoulder on the nozzle $e$, thus producing a starting impulse in the crank-chamber.

The front edge of the piston A is arranged to overrun a port M in the cylinder-wall when the piston is near to its innermost position. This port opens to atmosphere to allow the products of combustion to escape at the termination of the starting impulse.

In another modification of this invention (shown diagrammatically at Fig. 3) I may also arrange an engine with two cylinders facing one another whose pistons are each fitted with two connecting-rods driving onto a pair of cranks, as hereinbefore described. I find this arrangement specially desirable when short connecting-rods are expedient and for very high speeds. This modification is shown diagrammatically in Fig. 3.

The two oppositely-rotating cranks may be connected by gearing to prevent the possibility of their directions of rotation becoming reversed.

In one mode of constructing a vaporizer in accordance with the present invention I arrange an oil-reservoir N, Fig. 4, into which dips the lower extremity of a bundle O of lamp-wick, the other end of which passes into and fills an upper chamber P, through which a certain amount of air is drawn by the suction-stroke of the engine. I preferably arrange the wick to enter the upper chamber P through an aperture, round which runs an annular groove Q, into which the air is led by a suitable passage Q′, the said annular groove being covered by a ring of wire-gauze or perforated metal R, through which the air passes into the loose mass of lamp-wick. Here it becomes saturated with oil-vapor ready to be drawn off through a gauze disk S or perforated plate fitted above the wick-space.

Where a very volatile oil is employed, air may be allowed to enter the vaporizer at atmospheric temperature. Frequently, however, it is found advantageous to initially heat the air by taking it through a super-heater consisting of a casing or coil arranged round the ignition-tube or exhaust-pipe or adjacent to walls of the cylinder or compression-space.

When a very volatile oil is employed, the carbureted air may be admitted to the engine by an ordinary gas-valve opening into the air-passage and operated by hit-and-miss mechanism of the ordinary construction. When, however, a less volatile oil is employed, I arrange a piston T on the stem of the gas-valve U, (see Figs. 5 and 6,) which when the said valve is operated closes or partially closes the air-supply passage V, thereby causing the whole or a large part of the charge to be drawn in through the vaporizer.

Having now described my invention, what I claim as new, and desire to secure by Letters Patent, is—

1. In combination in an engine with its cylinder and piston, a pair of crank-shafts arranged end to end in line with each other, the cranks thereon arranged side by side, a pair of piston-rods connecting directly with the cranks and with the piston, substantially as described.

2. In combination in an engine, with its cylinder and piston, a pair of crank-shafts arranged end to end and in line with each other, the cranks thereon arranged side by side, a pair of piston-rods connected pivotally and directly to both the piston and the cranks and counterbalance-weights on the cranks, substantially as described.

3. In combination in an engine, with its cylinder and piston, a pair of crank-shafts arranged end to end, a pair of cranks thereon, piston-rods connected pivotally and directly with both the piston and the cranks and a pair of oppositely-moving fly-wheels on the crank-shafts, substantially as described.

4. In combination with the cylinder and piston, the crank-shaft, the chamber inclosing the same and the front end of the cylinder and means for introducing a charge into the crank-chamber and for igniting it, said parts having a suitable exhaust controlled by the movement of the piston.

5. In combination in a gas-engine, a cylinder with its piston, a vaporizer, a gas-valve an air-passage and a piston on the stem of the gas-valve to close or partially close the air-passage when the valve is operated to thereby cause the whole of the charge to be drawn through the vaporizer.

In witness whereof I have hereunto set my hand in presence of two witnesses.

FREDERICK WILLIAM LANCHESTER.

Witnesses:
HERBERT BOWKETT,
HENRY THOMAS ELLIS.